United States Patent [19]
Hnath

[11] 3,907,364
[45] Sept. 23, 1975

[54] DUMP VEHICLE
[76] Inventor: Bernard J. Hnath, P.O. Box 47, Ashland, Wis. 54806
[22] Filed: Mar. 23, 1973
[21] Appl. No.: 344,110

[52] U.S. Cl.................................. 298/11; 298/17.5
[51] Int. Cl.² ............................................ B60P 1/34
[58] Field of Search............................ 298/11, 17.5

[56] References Cited
UNITED STATES PATENTS
| | | | |
|---|---|---|---|
| 1,411,801 | 4/1922 | Morton | 298/11 |
| 3,066,984 | 12/1962 | Hori | 298/11 |
| 3,336,080 | 8/1967 | Heck | 298/17.5 |

FOREIGN PATENTS OR APPLICATIONS
| | | | |
|---|---|---|---|
| 1,317,383 | 2/1963 | France | 298/11 |
| 696,609 | 10/1930 | France | 298/11 |
| 1,324,375 | 3/1963 | France | 298/11 |

Primary Examiner—Robert J. Spar
Assistant Examiner—George F. Abraham
Attorney, Agent, or Firm—J. Harold Kilcoyne

[57] ABSTRACT

A dump vehicle comprising a wheeled main frame, an elongate sub-frame overlying and being connected to the main frame by means enabling the sub-frame to swing in an ascending arc responsive to the application of a lift force thereto, a dump body or box assembly connected at its rearward end portion to the preferably rearward end of the sub-frame by means enabling said assembly to swing in an ascending arc responsive to the application of lift force thereto, and powered lift mechanism operatively related and connected to the main frame, the sub-frame and the dump body assembly for applying lift force requisite to the lifting and dumping or the particular burden of cargo then contained in the dump body and including means for applying the lift force first to the forward end of the dump body and thereafter to its rearward end.

7 Claims, 5 Drawing Figures

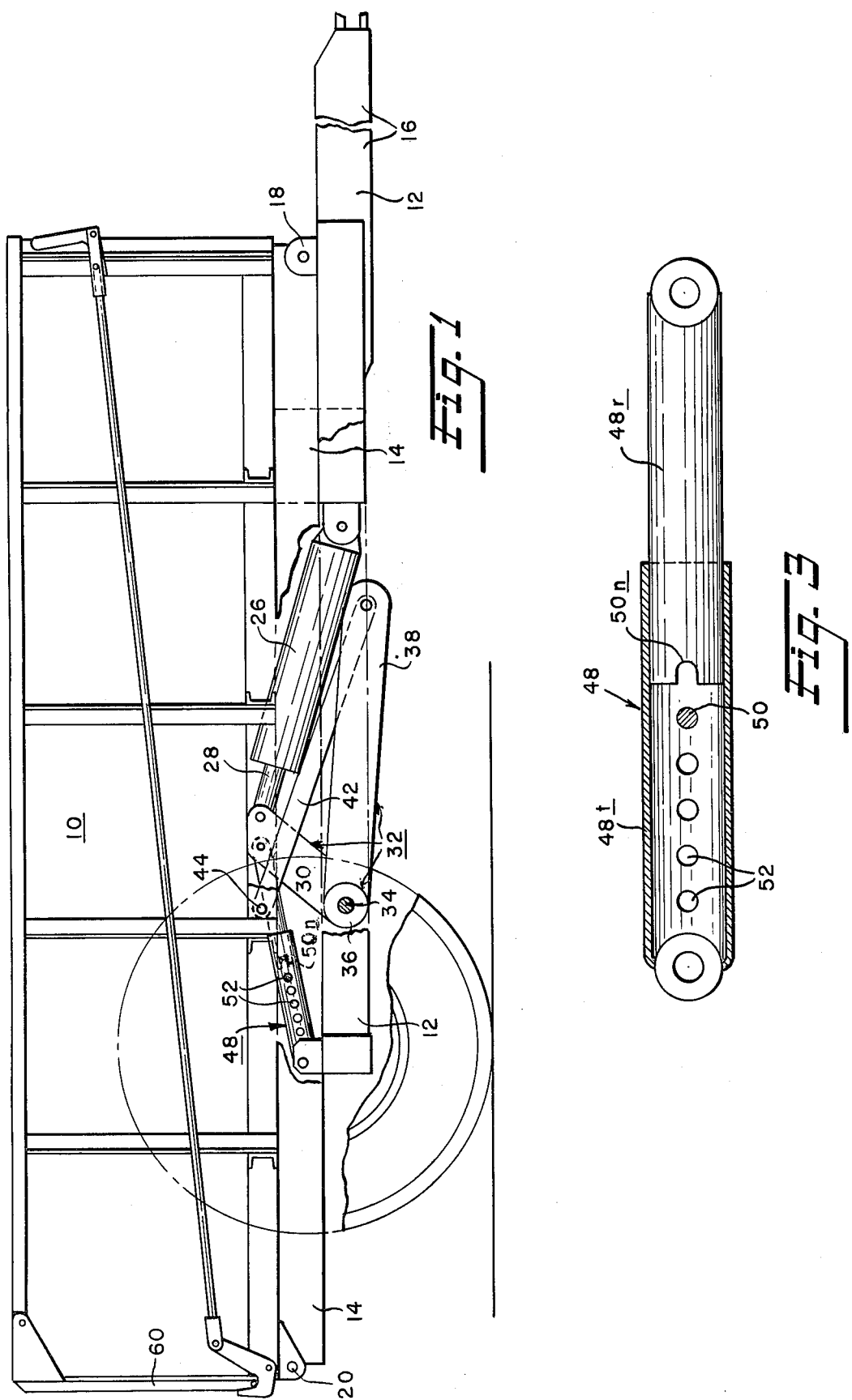

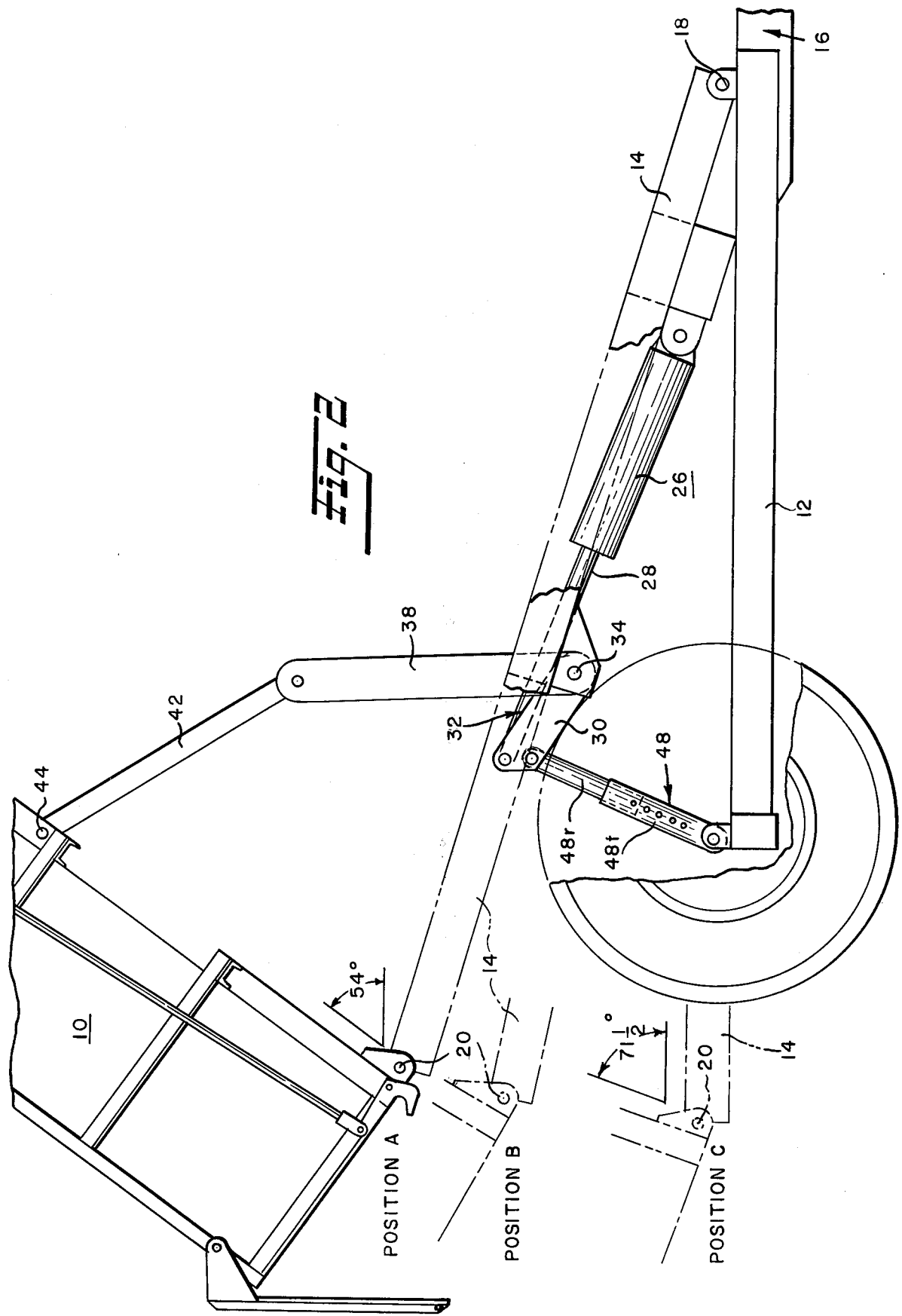

2

DUMP VEHICLE

INTRODUCTION

This invention relates to improvements in dump vehicles, i.e. dump wagons, dump trucks and the like, and in its more specific aspects to improved high-lift mechanism for actuating the burden- or cargo-containing body or box assembly thereof to a pre-selected one of a plurality of dumping heights and dumping angles with respect to the wheel-supported main frame of the vehicle.

OBJECTS OF THE INVENTION

Among the objects and aims of the present invention are noted the following: the provision of a low-profile dump vehicle capable of discharging (dumping) its load in a high pile for stacking in a small area; the provision of a dump vehicle incorporating means whereby the discharge height of its burden- or cargo-containing dump body may be varied within wide limits; the provision of a dump vehicle as last aforesaid wherein the variable discharge heights are such as to satisfy the height requirements for both the lighter and the heavier types of cargo; the provision of a high-lift mechanism for dump vehicles incorporating means operative to supply lift force to the front end of the dump body or box assembly prior to imparting lift force to the rear end of said body assembly, thereby substantially reducing the overall lifting force requirements; and the provision of high-lift mechanism as last aforesaid wherein said means may be adjusted so as to apply a lift force only to the front end of the wagon box or body.

DETAILED DESCRIPTION

The above and other objects and features of advantages of a dump vehicle according to the invention will be described in detail or will be apparent from the following description of the invention, taken with the accompanying illustrative drawings, wherein FIG. 1 is a side elevation, with parts broken away, of a so-called high-lift dump trailer according to the invention, the view showing the lift mechanism in its inactive or collapsed condition;

FIG. 2 is a similar view illustrating the trailer box or body assembly in its "high-lift" position to which it has been actuated by the lifting mechanism of the invention, the view further illustrating the wide range of dump angles at which dumping of the cargo or burden carried by the box or body assembly may be effected;

FIG. 3 is a detail view, in section, illustrating the preferred construction of one of the rear actuating links of the lift mechanism of the invention;

Figure 4:
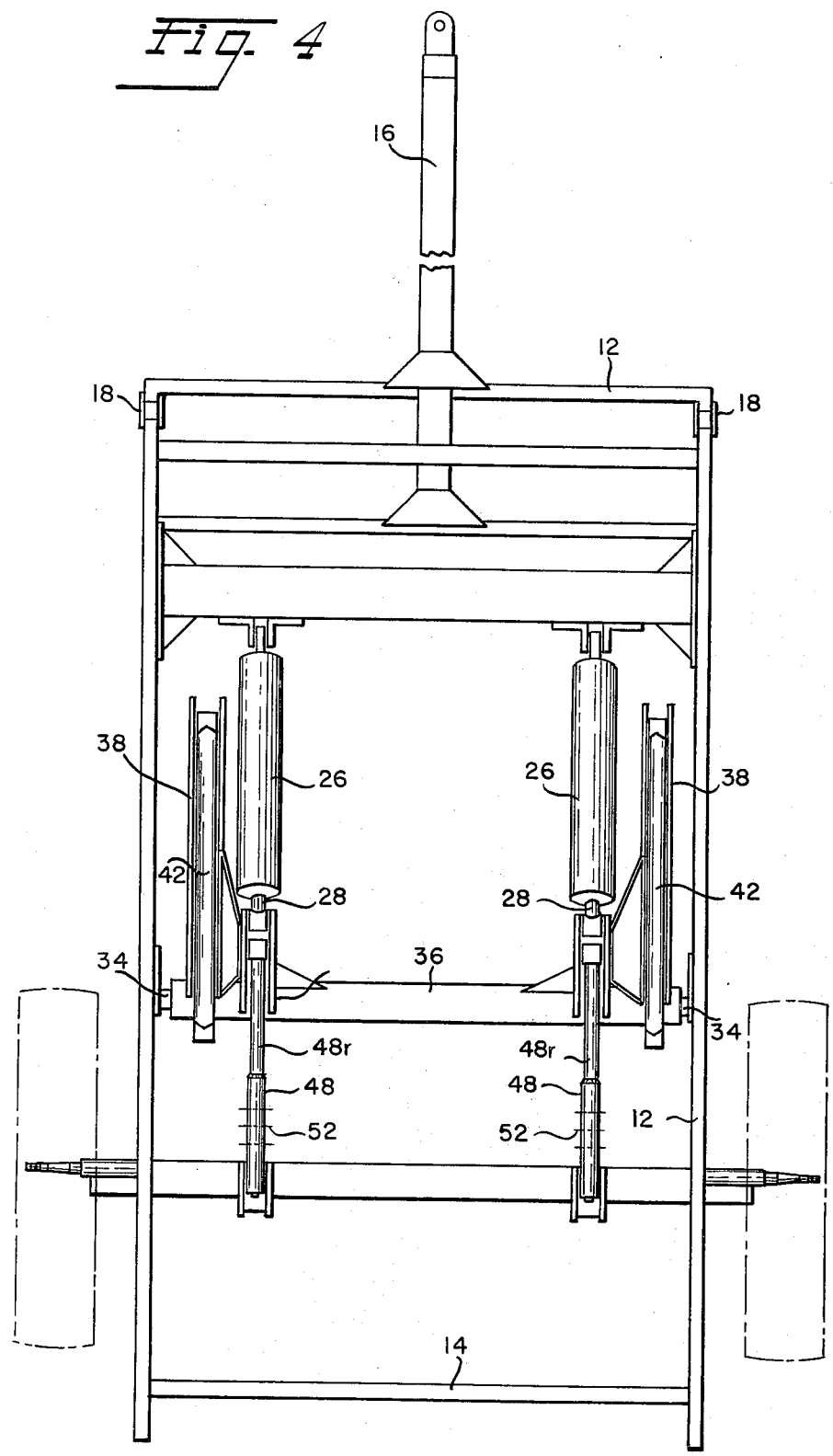
FIG. 4 is a plan view looking down onto the dumpbody lift mechanism.
Figure 5:
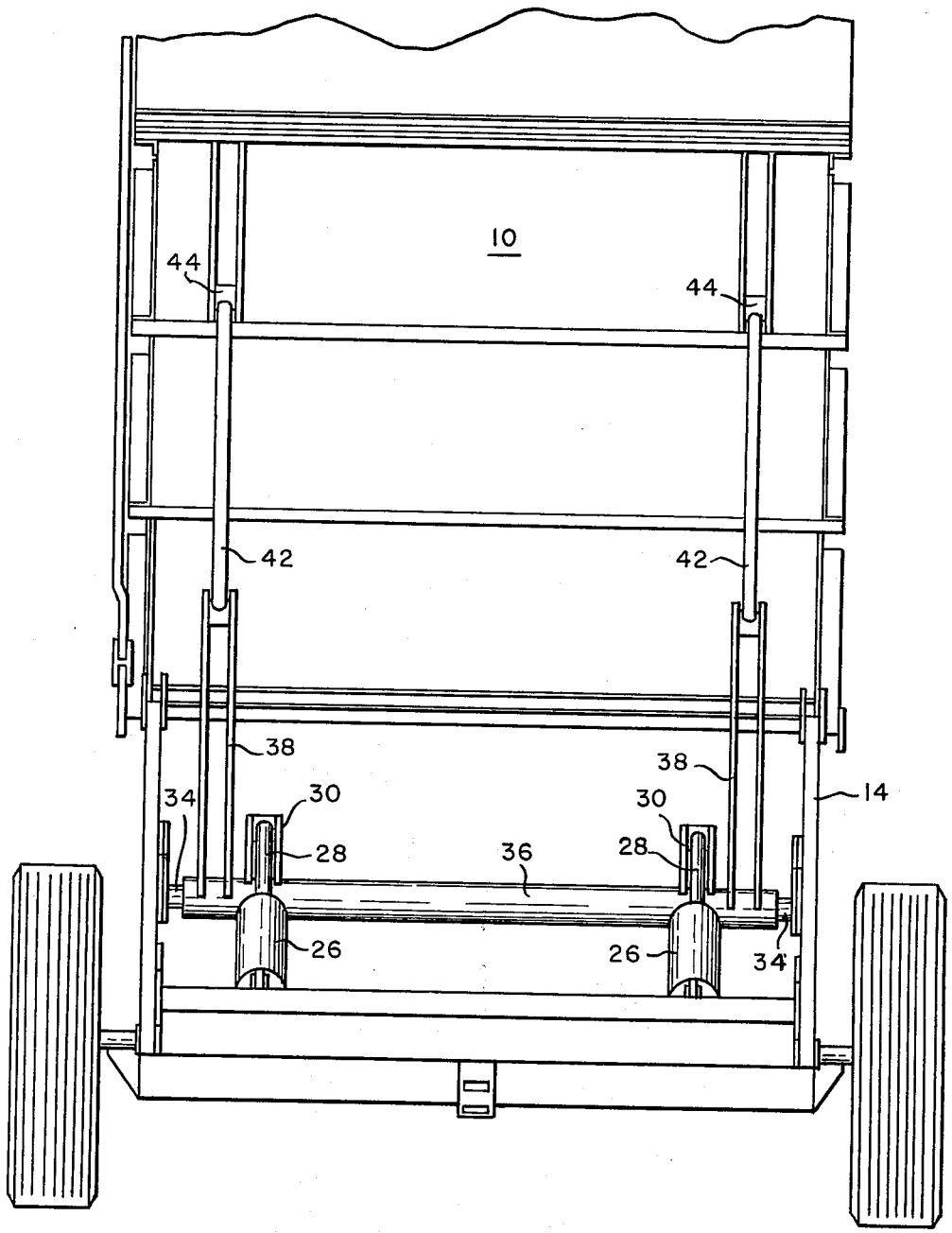
FIG. 5 is a front assembly view looking onto the under side of the dump body in its raised position in which it is shown in FIG. 2.

Referring to the drawing figures, reference numeral 10 designates a dump body or box assembly, 12 a wheeled main frame and 14 an elongate sub-frame. Illustratively, the main frame is the wheeled frame of a dump trailer having at its forward end a tongue connection 16 to a tractor (not shown). The sub-frame 14 is connected adjacent its forward end to the main frame by means 18 enabling said sub-frame to swing in an ascending arc responsive to lift force being applied thereto, and said dump body assembly is connected at or adjacent its rear end to the rearward end of the sub-frame by means 20 enabling said assembly to swing independently of the sub-frame in an ascending arc upon application of lift force thereto.

According to the invention, the sub-frame 14 mounts a pair of parallelly arranged hydraulic cylinders 26 whose piston rods 28 extend relatively rearwardly and at a slight upward inclination. Said piston rods 28 are connected to paired parallelly-disposed cranks 30 of duplex-armed bell-crank assemblies designated 32 mounted for forward-rearward rocking motion about a floating cross rod 34 which extends crosswise between the side members of the sub-frame 14. More particularly said bell crank assemblies comprise the aforementioned cranks 30, a tubular cross shaft 36 journaled on the cross rod 34, and paired parallelly disposed actuating arms 38 rigid with said tubular cross shaft and which by reference to FIG. 1 extend forwardly and normally incline downwardly from the horizontal by a slight angle.

The aforesaid actuating arms 38 of the bell crank assemblies connect at their forward ends with front actuating (lift applying) links 42 which extend rearwardly to and are in turn connected by means 44 to points on the underside of the dump body or box assembly 10. Accordingly, as the cranks 30 are actuated (swung) relatively rearwardly with extension of the piston rods 28 of the hydraulic power cylinders 26, lift force is applied to the dump-body assembly 10 from beneath same, i.e. at points on its underside which are so located that the lift force is directed principally to the forward end of said body assembly.

The hydraulic cylinders 26 are adapted to apply lift force to the rearward end of the dump-body assembly also, but via the aforesaid linkage 42, 38, 32 and the rear actuating (lifting) links or strut means generally designated 48 interpositioned between the cranks 30 of the bell-crank assemblies 32 and the main frame 12. More particularly, said rear actuating strut means are telescopic in structure, being comprised of rod and tube components, the rod components 48r being connected to the cranks 30 of the bell-crank assemblies at points which are normally disposed somewhat rearwardly of the points of connection of the piston rods 28 therewith, and the tube components 48t being connected to the main frame 12 adjacent its rearward end.

The effective length of the said strut means 48 can be preselected by the positioning along the length of their tube components of a cross pin 50 in any one of a series of cross holes 52 provided therein. To insure positive seating of the rod-component ends on cross pins 50, said ends are each preferably formed with a semi-circular pin-seating notch 50n.

The feature of the invention that it operates on the principle of transmitting and applying lift force initially to the front-end portion of the dump body assembly 10 via the links 42 as aforesaid is highly advantageous, as it greatly reduces the so called "break-away" pressure requirement by having in the first instance to lift only the front end of the dump body assembly and its contents.

Continued extension of the power-cylinder piston rods 28 results in the application of lift force to the rear end of the sub-frame (via the dump body assembly) requisite to actuation of same in an ascending arc, the telescopic rear actuating links 48 during the course thereof acting first as push-up (lifting-force applying)

links and finally as sub-frame and dump-body support struts.

Responsive to the power cylinders actuating their piston rods 28 throughout their full working stoke and assuming the strut-provided cross pins 50 to have been set at their maximum-length positions, both the dump body assembly and the sub-frame will assume their respective "high-lift" positions designated Position "A" (FIG. 2). When the strut means are adjusted (shortened) to their shortest possible length, both the dump body assembly and the sub-frame will assume Position "B". Setting the length of the strut means in increments between maximum and minimum will provide proportionate lift heights between Positions A and B aforesaid.

Should the strut means be rendered wholly inactive or be completely removed, such lifting force as is generated by the power cylinders is transmitted only to the dump body assembly, the sub-frame holding to its initially generally horizontal position designated Position "C", FIG. 2.

Dumping of the load or burden in the dump body or box can be effected at any instant of the cycle by unlatching the rear tail-gate 60 for which conventional means are provided, such allowing the tail-gate to swing to open position.

In addition to the foregoing, a dump vehicle constructed and operating in accordance with the principles of the invention is considered to be unique in that it can be built to have and maintain a low profile, as permits low-level loading and transport, while at the same time it is able to discharge its cargo or burden in a ground-level high pile taking up small area, and/or onto a high-level platform or the like. Also, it provides for wide variation in the heights at which discharge or unloading of burden may be effected, a feature which adapts it to unloading at the various heights appropriate to specific cargos or burdens. Its construction and principle of operation are further such that it is adapted to the transport and dumping of both the lighter and the heavier types of cargo and at minimum cost.

Having thus described my improvements in a dump vehicle, I claim the following to be patentable subject matter:

1. A dump vehicle comprising, in combination, a mobile main frame, an elongate sub-frame connected at its forward end portion for swinging motion in upward direction to one of a plurality of angular positions of inclination with respect to the main frame, a dump body assembly connected at its rearward end portion to the rearward end of the sub-frame both for swinging motion independently of the sub-frame to one of a plurality of lift heights and also for swinging motion therewith, and power means carried by the sub-frame for applying lift force to the forward end of the dump body to first pivot the dump body on the sub-frame and thereafter lift it and the attached rearward end portion of the sub-frame whereupon both dump body and sub-frame swing in unison to a desired lift height.

2. A dump vehicle according to claim 1, wherein the portion of said power means for causing the lift force to be applied to the rearward end portion of the sub-frame comprises an adjustable-length strut means which is a part of a series of links extending between the dump body assembly and a fixed part of the wheeled main frame.

3. A dump vehicle according to claim 2, wherein said adjustable-length strut means incorporates means for adjusting the length thereof from an effective zero length to varying lengths.

4. A dump body according to claim 3, wherein said adjustable-length strut means comprises telescopically related rod and tube components and a cross pin insertible in aligned cross holes provided in said tube components for setting the effective length of said strut means.

5. A dump vehicle according to claim 1, wherein said power means comprises hydraulic cylinder means carried by the sub-frame, a bell-crank assembly mounted for rocking motion about a transverse floating axis when actuated by said cylinder means, fixed-length actuating links providing a direct connection between the rocking cranks of the bell-crank assembly and forward points on the under-side of the dump body, adjustable-length sub-frame lifting struts interposed between said cranks and the main frame, and means for adjusting the effective length of said struts from zero to a predetermined one of a plurality of effective lengths.

6. A dump vehicle according to claim 1, wherein said power means comprise hydraulic cylinder means carried by the sub-frame, a bell-crank assembly mounted for rocking motion about a transverse floating axis when actuated by said cylinder means, fixed-length lifting links providing a direct connection between the rocking cranks of the bell-crank assembly and forward points on the under-side of the dump body, adjustable-length sub-frame lifting struts interposed between said cranks and the main frame and means for adjusting the effective length of said struts from zero to a preselected one of a plurality of effective lengths.

7. A dump vehicle according to claim 5, wherein said adjustable-length sub-frame lifting struts comprise telescopically-related rod and tube components and a cross pin insertible in aligned cross holes provided in said tube components for setting the effective length of said struts.

* * * * *